United States Patent
Nakazawa

(10) Patent No.: US 11,529,708 B2
(45) Date of Patent: Dec. 20, 2022

(54) FAN-EQUIPPED MOTOR

(71) Applicant: FANUC CORPORATION, Minamitsuru-gun (JP)

(72) Inventor: Yasuyuki Nakazawa, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 313 days.

(21) Appl. No.: 16/945,001

(22) Filed: Jul. 31, 2020

(65) Prior Publication Data

US 2021/0039215 A1   Feb. 11, 2021

(30) Foreign Application Priority Data

Aug. 6, 2019   (JP) .............................. JP2019-144509

(51) Int. Cl.
*B23Q 11/12* (2006.01)
*H02K 9/14* (2006.01)
*H02K 9/193* (2006.01)

(52) U.S. Cl.
CPC .............. *B23Q 11/127* (2013.01); *H02K 9/14* (2013.01); *H02K 9/193* (2013.01)

(58) Field of Classification Search
CPC .. H02K 9/00; H02K 9/08; H02K 9/14; H02K 9/18; H02K 9/19; H02K 9/193; H02K 9/197; B23Q 11/00; B23Q 11/10; B23Q 11/103; B23Q 11/101; B23Q 11/1015; B23Q 11/12; B23Q 11/127; F16L 39/00; F16L 39/04
See application file for complete search history.

(56) References Cited

U.S. PATENT DOCUMENTS

| 5,589,720 A | * | 12/1996 | Berger | H02K 9/197 310/61 |
| 6,078,115 A | * | 6/2000 | Uchida | H02K 9/193 310/58 |
| 2002/0159852 A1 | | 10/2002 | Katsuzawa et al. | |
| 2009/0028730 A1 | * | 1/2009 | Radermacher | H02K 7/14 415/177 |
| 2016/0167185 A1 | | 6/2016 | Nakazawa | |

FOREIGN PATENT DOCUMENTS

| JP | S57-155968 U | 9/1982 |
| JP | 2966799 B2 | 10/1999 |
| JP | 3806312 B2 | 8/2006 |
| JP | 2015-192474 A | 11/2015 |
| JP | 5980891 B2 | 8/2016 |

* cited by examiner

*Primary Examiner* — Tran N Nguyen
(74) *Attorney, Agent, or Firm* — McGinn IP Law Group, PLLC

(57) ABSTRACT

A fan-equipped motor includes: a motor for rotating a spindle, the motor including a hollow-shaped motor shaft in which a through hole is formed; and a fan for cooling the motor, the fan including a hollow-shaped rotary shaft in which a through hole is formed, and a plurality of blades attached to the rotary shaft, the fan being disposed on the side of the motor that is opposite to the spindle. The motor shaft and the rotary shaft are disposed so that cooling air produced by the fan flows in a different passage and in a different direction from a gas supplied into the through hole of the rotary shaft and flowing in the through hole of the motor shaft.

7 Claims, 4 Drawing Sheets

FAN-EQUIPPED MOTOR

CROSS-REFERENCE TO RELATED APPLICATION

This application is based upon and claims the benefit of priority from Japanese Patent Application No. 2019-144509 filed on Aug. 6, 2019, the contents of which are incorporated herein by reference.

BACKGROUND OF THE INVENTION

Field of the Invention

The present invention relates to a motor that is equipped with an air-cooling fan.

Description of the Related Art

As disclosed in Japanese Patent No. 2966799, a motor in which fluid is passed through a through hole formed in the rotary shaft of the motor requires provision of a rotary joint between the motor and an air-cooling fan so as to supply the fluid into the through hole.

SUMMARY OF THE INVENTION

However, providing the rotary joint between the motor and the air-cooling fan as disclosed in Japanese Patent No. 2966799 lengthens the distance from the motor to the fan and complicates the structure.

Accordingly, an object of the present invention is to provide a fan-equipped motor having a shorter overall length and a simpler structure.

An aspect of the present invention is directed to a fan-equipped motor including: a motor configured to rotate a spindle, the motor including a hollow-shaped motor shaft in which a through hole is formed; and a fan configured to cool the motor, the fan including a hollow-shaped rotary shaft in which a through hole is formed, and a plurality of blades attached to the rotary shaft, the fan being disposed on a side of the motor opposite to the spindle, wherein the motor shaft and the rotary shaft are disposed so that cooling air produced by the fan flows in a different passage and in a different direction from a gas supplied into the through hole of the rotary shaft and flowing in the through hole of the motor shaft.

According to the present invention, it is thus possible to shorten the overall length with a simple structure.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

The fan-equipped motor according to the present invention will be described in detail below in connection with preferred embodiments while referring to the accompanying drawings.

Embodiment

Figure 1:
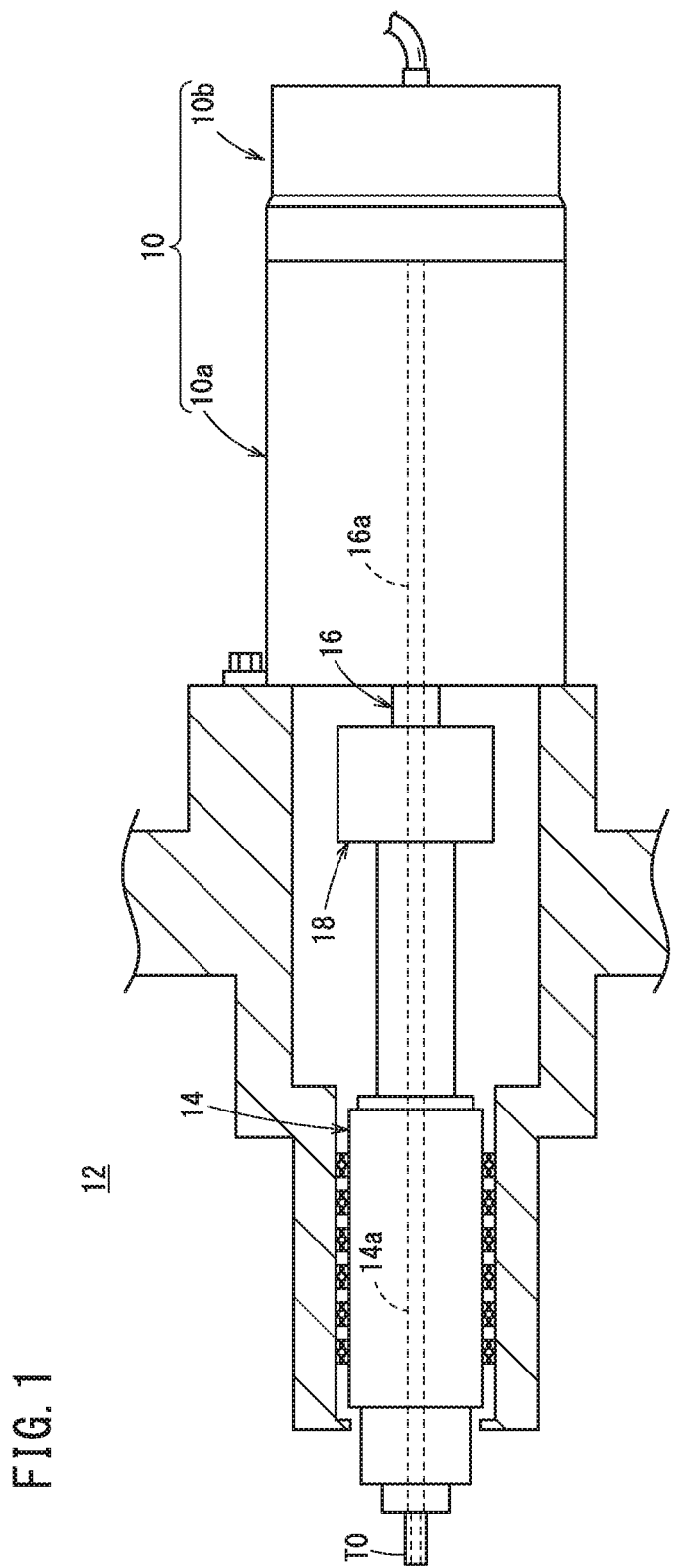
FIG. 1 is a diagram illustrating a spindle structure including a fan-equipped motor according to an embodiment.

FIG. 1 is a diagram illustrating a spindle structure 12 including a fan-equipped motor 10 according to an embodiment. The spindle structure 12 includes a spindle 14 that is held rotatably, a motor 10a for rotating the spindle 14, and a coupling 18 connecting the spindle 14 and a motor shaft 16 of the motor 10a. The motor 10a is equipped with a fan 10b which is disposed on the side of the motor 10a opposite to the spindle 14 and cools the motor 10a. The motor 10a and the fan 10b constitute the fan-equipped motor 10. The spindle 14 and the motor shaft 16 have hollow structures respectively with through holes 14a and 16a formed therethrough, where the through holes 14a and 16a communicate with each other. A tool TO is attached at the tip of the spindle 14.

Figure 2:
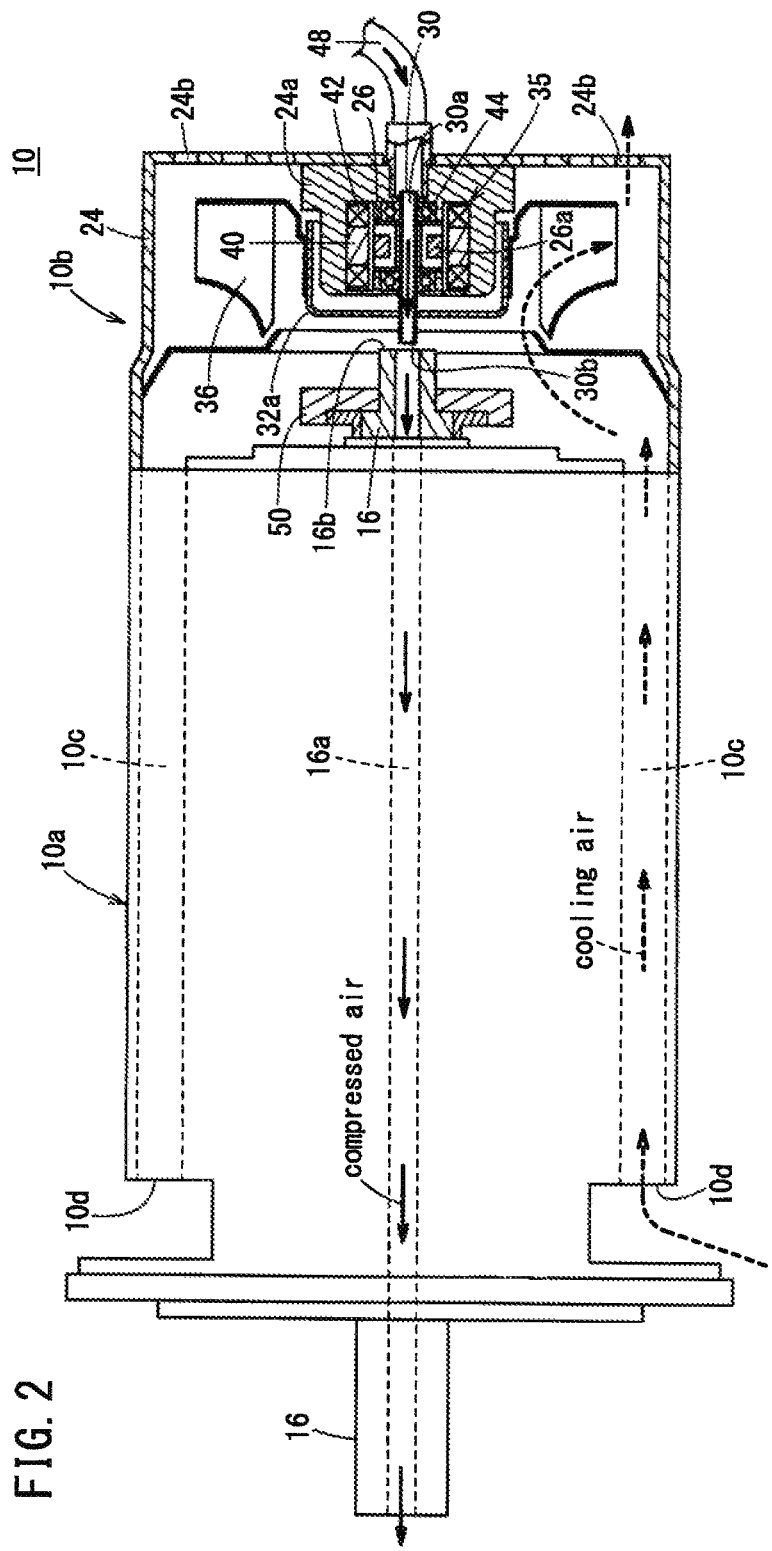
FIG. 2 is a detailed drawing of the fan-equipped motor according to the embodiment.

FIG. 2 is a detailed drawing illustrating the fan-equipped motor 10 according to the embodiment. In FIG. 2, the fan 10b is shown in cross section. The fan 10b includes a housing 24, a motor 35, a rotary shaft 30, and a plurality of blades 36 attached to the rotary shaft 30. The rotary shaft 30 has a hollow structure with a through hole 30a formed therethrough. The motor 35 includes a rotor core 26 integrated with the rotary shaft 30, a stator core 40, and bearings 44. The rotor core 26 includes magnets 26a therein if the fan motor is of synchronous type, but the fan motor may be of induction type. The stator core 40 includes stator coil(s) 42. The plurality of blades 36 are attached to the rotary shaft 30 with a member 32a therebetween. A specific example of the blades 36 can be blades used for a centrifugal fan, for example.

The stator core 40 and the stator coil(s) 42 are disposed inside the housing 24 of the fan 10b, via a supporting member 24a fixed to the housing 24. The bearings 44 support the rotary shaft 30 rotatably with respect to the supporting member 24a.

An air pipe 48 is attached to the housing 24 on the side opposite to the motor 10a. One end of the air pipe 48 is inserted in the housing 24 so that gas (compressed air) can be sent into the through hole 30a from the air pipe 48 without contact with the rotary shaft 30. The compressed air may be a gas that contains a mist for semidry machining, in which case the mist can be oil, for example.

A circular plate-like flinger 50 is integrally attached to the motor shaft 16 on the fan 10b side, so as to prevent entry of dust etc. into the motor 10a. The part of the motor shaft 16 located on the fan 10b side and the flinger 50 reside in the housing 24 of the fan 10b. The motor 10a has passage(s) 10c formed therein along the axial direction of the motor shaft 16. Outside air is drawn by the blades 36 of the fan 10b as cooling air for the motor 10a, from opening(s) 10d formed in the motor 10a on the spindle 14 side and through the passage(s) 10c, and is discharged from openings 24b of the fan 10b. In this way, the cooling air and the gas (compressed air) flow through passages along different routes and in different directions.

Now, the motor shaft 16 and the rotary shaft 30 are disposed so that the compressed air supplied into the through hole 30a of the rotary shaft 30 can flow through the through hole 16a of the motor shaft 16. Specifically, one end 16b of the motor shaft 16 on the rotary shaft 30 side, and one end 30b of the rotary shaft 30 on the motor shaft 16 side, are disposed in such a manner that the opening of the through hole 16a and the opening of the through hole 30a are spaced from each other within a given distance. Further, the motor shaft 16 and the rotary shaft 30 are disposed coaxially with each other. Thus, the compressed air supplied from the air pipe 48 flows sequentially in the through holes 30a, 16a, 14a and is emitted from the tool TO.

As described so far, the fan-equipped motor 10 of this embodiment allows the compressed air to flow in the through hole 16a of the motor shaft 16 to be emitted from the tool TO, without using a rotary joint. It is thus possible to shorten the overall length of the fan-equipped motor 10 with a simple structure.

[Modifications]

The embodiment described above can be modified as shown below.

(First Modification)

Figure 3:
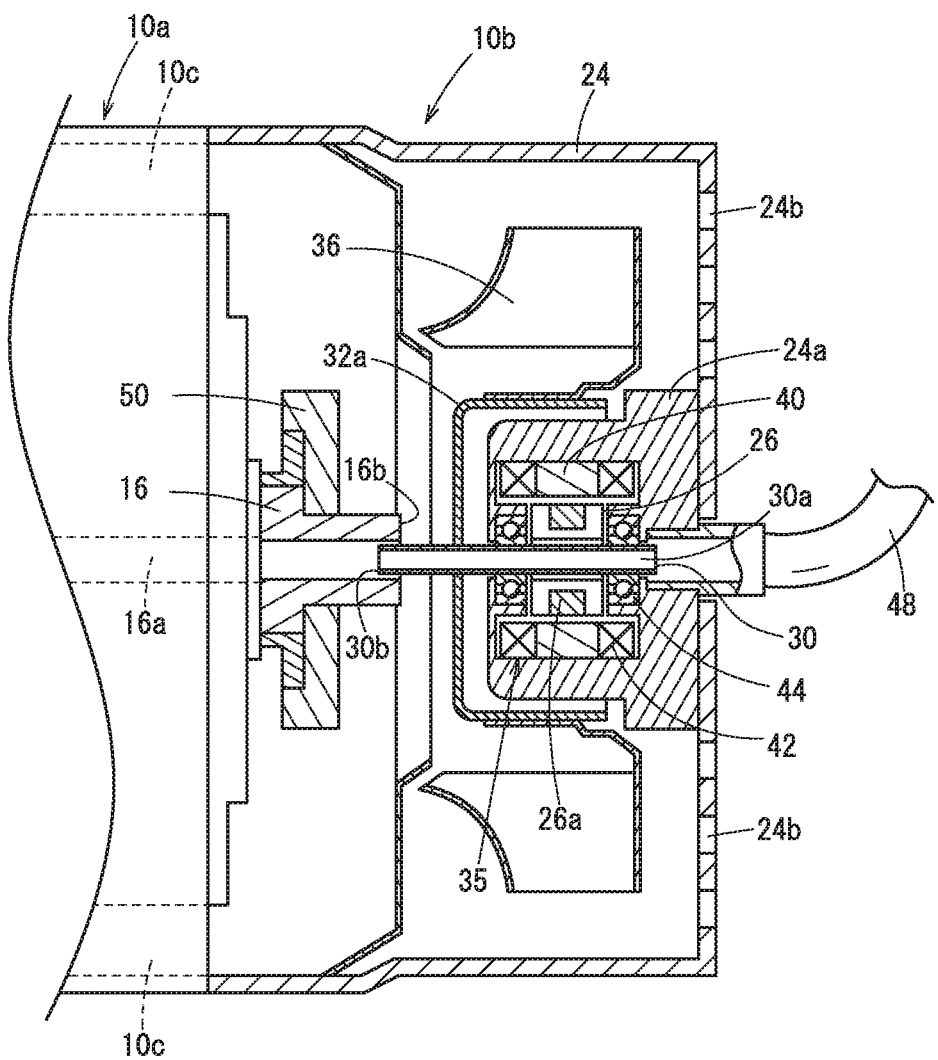
FIG. 3 is a detailed drawing illustrating a fan-equipped motor according to a first modification.

FIG. 3 is a detailed drawing illustrating a fan-equipped motor 10 according to a first modification. In the above-described embodiment, the one end 16b of the motor shaft 16 and the one end 30b of the rotary shaft 30 are disposed in such a manner that the opening of the through hole 16a and the opening of the through hole 30a are spaced from each other within a given distance. In contrast, in this first modification, the one end 30b of the rotary shaft 30 is inserted in the through hole 16a at the one end 16b of the motor shaft 16 in a noncontact state. The compressed air can thus be supplied from the through hole 30a into the through hole 16a with reduced leakage.

This configuration can be modified in an opposite way, where the one end 16b of the motor shaft 16 may be inserted in the through hole 30a at the one end 30b of the rotary shaft 30 in a noncontact state. This configuration offers the same effect as that described above.

(Second Modification)

Figure 4:
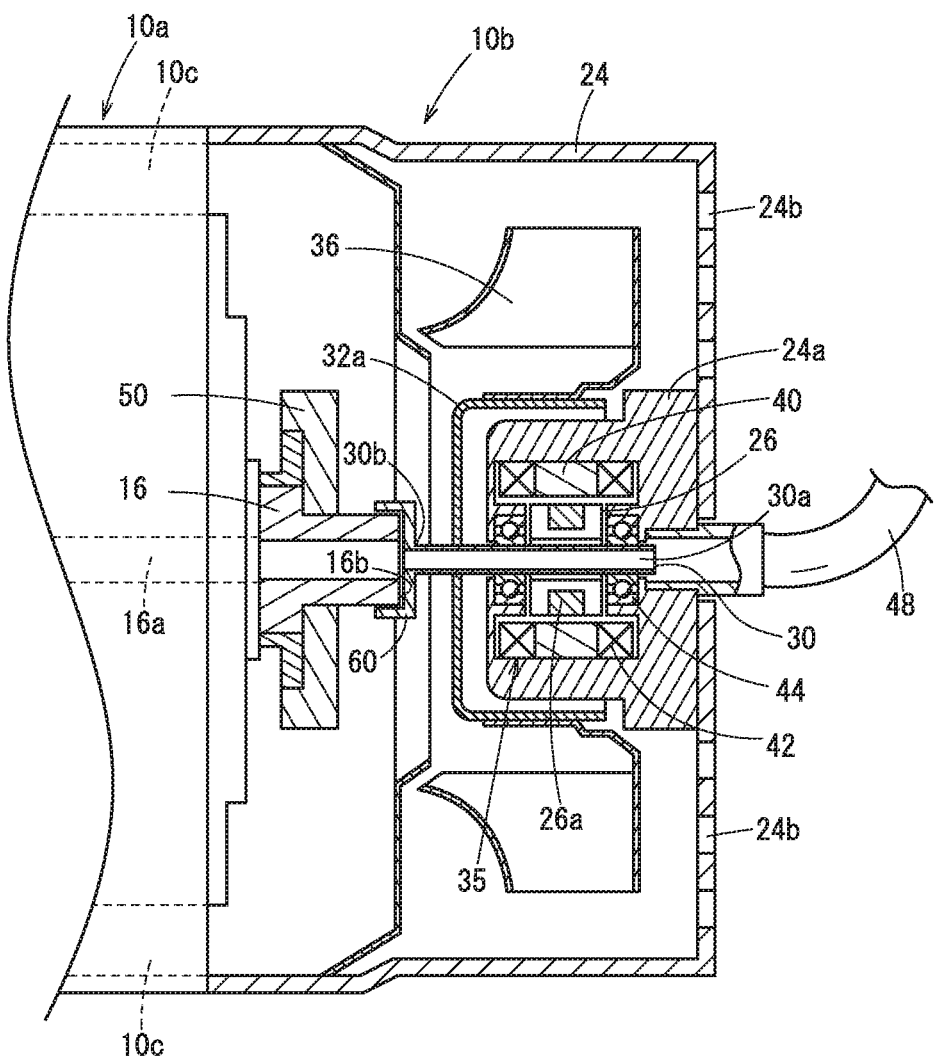
FIG. 4 is a detailed drawing illustrating a fan-equipped motor according to a second modification.

FIG. 4 is a detailed drawing illustrating a fan-equipped motor 10 according to a second modification. In the second modification, a leakage preventing member 60 is provided at the one end 30b of the rotary shaft 30. The diameter of the motor shaft 16 is larger than the diameter of the rotary shaft 30, and the leakage preventing member 60 is provided at the one end 30b of the rotary shaft 30 so as to cover the one end 16b of the motor shaft 16 in a noncontact state. Specifically, the leakage preventing member 60 covers the one end 16b of the motor shaft 16 in a noncontact state in such a manner as to surround the end surface of the one end 16b and part of its side surface in a cylindrical manner. The leakage preventing member 60 is a member for preventing leakage of the gas (compressed air) from between the one end 30b of the rotary shaft 30 and the one end 16b of the motor shaft 16. The provision of the leakage preventing member 60 allows the compressed air to be supplied from the through hole 30a into the through hole 16a with reduced leakage.

The leakage preventing member 60 may be provided at the one end 16b of the motor shaft 16. In this case, the leakage preventing member 60 is provided at the one end 16b of the motor shaft 16 so as to cover the one end 30b of the rotary shaft 30 in a noncontact state. This configuration offers the same effect as that described above. The diameter of the rotary shaft 30 may be larger than the diameter of the motor shaft 16.

Alternatively, the leakage preventing member 60 may be provided inside the housing 24 of the fan 10b in such a manner as to cover the space between the motor shaft 16 and the rotary shaft 30 like a cylinder, without contacting either of the motor shaft 16 and the rotary shaft 30.

Invention Obtained from Embodiments

The invention graspable from the embodiments above will be recited below.

A fan-equipped motor (10) includes: a motor (10a) for rotating a spindle (14), the motor (10a) including a hollow-shaped motor shaft (16) in which a through hole (16a) is formed; and a fan (10b) for cooling the motor (10a), the fan (10b) including a hollow-shaped rotary shaft (30) in which a through hole (30a) is formed, and a plurality of blades (36) attached to the rotary shaft (30), the fan (10b) being disposed on the side of the motor (10a) that is opposite to the spindle (14). The motor shaft (16) and the rotary shaft (30) are disposed so that cooling air produced by the fan (10b) flows in a different passage and in a different direction from a gas supplied into the through hole (30a) of the rotary shaft (30) and flowing in the through hole (16a) of the motor shaft (16).

It is thus possible to shorten the overall length of the fan-equipped motor (10) with a simple structure.

One end (16b) of the motor shaft (16) on the side of the rotary shaft (30) and one end (30b) of the rotary shaft (30) on the side of the motor shaft (16) may be disposed in such a manner that the openings of the respective through holes (16a, 30a) are spaced from each other within a given distance.

The fan-equipped motor (10) may further include a leakage preventing member (60) for preventing leakage of the gas from between the one end (30b) of the rotary shaft (30) and the one end (16b) of the motor shaft (16). It is thus possible to supply the compressed air from the through hole (30a) into the through hole (16a) with reduced leakage.

The motor shaft (16) may have a diameter that is larger than a diameter of the rotary shaft (30), and the leakage preventing member (60) may be provided at the one end (30b) of the rotary shaft (30) so as to cover the one end (16b) of the motor shaft (16) in a noncontact state.

One end (16b, 30b), which is one of one end (16b) of the motor shaft (16) on the side of the rotary shaft (30) and one end (30b) of the rotary shaft (30) on the side of the motor shaft (16), may be inserted in a noncontact state in the through hole (16a, 30a) at the other (16b, 30b) of the one end (16b) of the motor shaft (16) and the one end (30b) of the rotary shaft (30). It is thus possible to supply the compressed air from the through hole (30a) into the through hole (16a) with reduced leakage.

The motor shaft (16) and the rotary shaft (30) may be disposed coaxially with each other.

The cooling air produced by the fan (10b) may pass through the interior of the motor (10a) other than the through hole (16a) of the motor shaft (16).

What is claimed is:

1. A fan-equipped motor comprising:
   a motor configured to rotate a spindle, the motor including a hollow-shaped motor shaft in which a through hole is formed; and
   a fan configured to cool the motor, the fan including a hollow-shaped rotary shaft in which a through hole is formed, and a plurality of blades attached to the rotary shaft, the fan being disposed on a side of the motor opposite to the spindle, wherein the motor shaft and the rotary shaft are disposed so that cooling air produced by the fan flows in a different passage and in a different direction from a gas supplied into the through hole of the rotary shaft and flowing in the through hole of the motor shaft.

2. The fan-equipped motor according to claim 1, wherein one end of the motor shaft on a side of the rotary shaft and one end of the rotary shaft on a side of the motor shaft are disposed in such a manner that openings of the respective through holes are spaced from each other within a given distance.

3. The fan-equipped motor according to claim 2, further comprising a leakage preventing member configured to prevent leakage of the gas from between the one end of the rotary shaft and the one end of the motor shaft.

4. The fan-equipped motor according to claim 3, wherein the motor shaft has a diameter that is larger than a diameter of the rotary shaft, and the leakage preventing member is provided at the one end of the rotary shaft so as to cover the one end of the motor shaft in a noncontact state.

5. The fan-equipped motor according to claim 1, wherein one of one end of the motor shaft on a side of the rotary shaft and one end of the rotary shaft on a side of the motor shaft is inserted in a noncontact state in the through hole at another of the one end of the motor shaft and the one end of the rotary shaft.

6. The fan-equipped motor according to claim 1, wherein the motor shaft and the rotary shaft are disposed coaxially with each other.

7. The fan-equipped motor according to claim 1, wherein the cooling air produced by the fan passes through an interior of the motor other than the through hole of the motor shaft.

* * * * *